Jan. 15, 1946.    N. R. RICHMOND    2,393,189
REMOTE INDICATING MEANS
Filed June 13, 1942    2 Sheets-Sheet 1
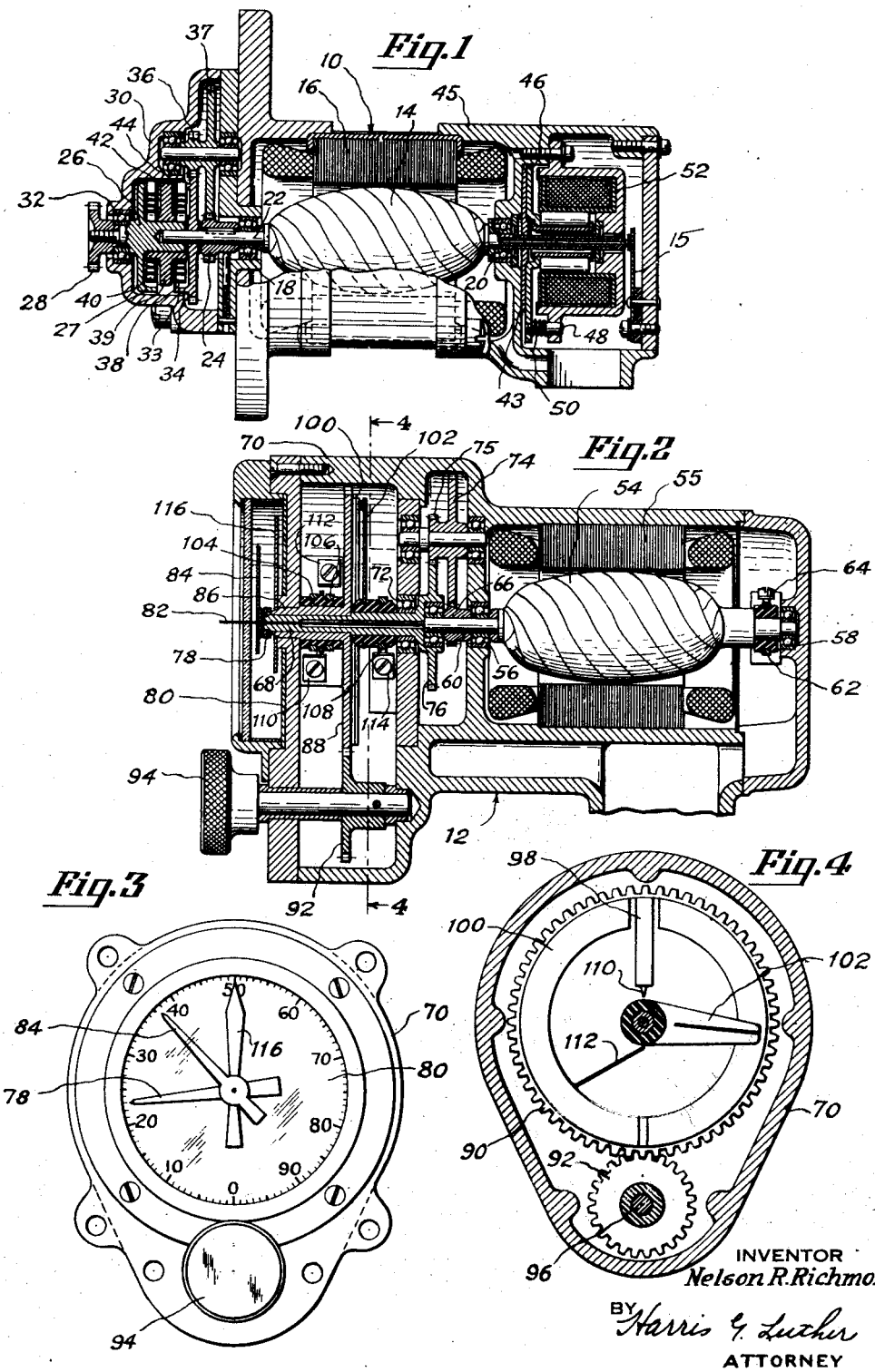
INVENTOR
Nelson R. Richmond
BY Harris G. Luther
ATTORNEY Jan. 15, 1946.     N. R. RICHMOND     2,393,189
REMOTE INDICATING MEANS
Filed June 13, 1942     2 Sheets-Sheet 2
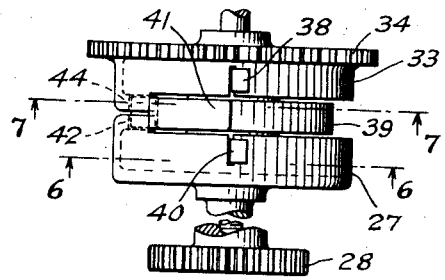
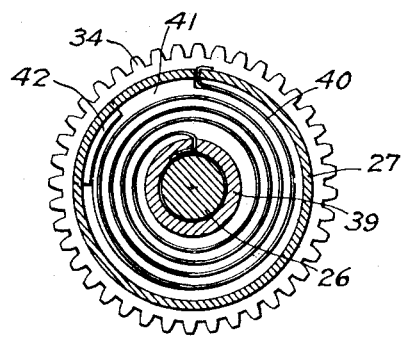
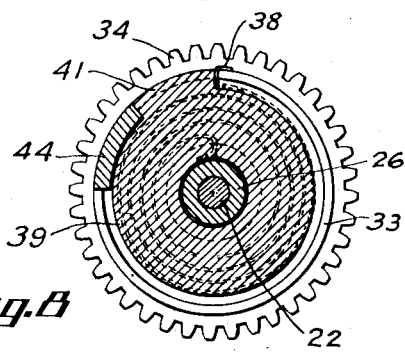
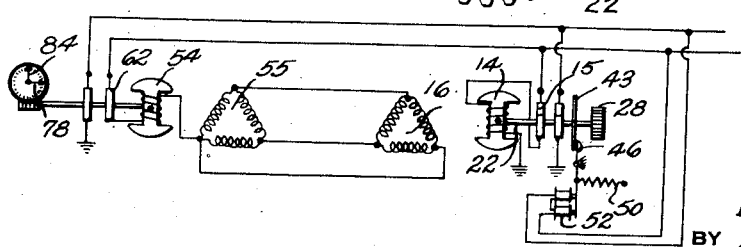
INVENTOR
Nelson R. Richmond
BY
ATTORNEY.

Patented Jan. 15, 1946

2,393,189

UNITED STATES PATENT OFFICE 2,393,189

REMOTE INDICATING MEANS

Nelson R. Richmond, Thompsonville, Conn., assignor to United Aircraft Corporation, East Hartford, Conn., a corporation of Delaware Application June 13, 1942, Serial No. 446,962

4 Claims. (Cl. 177—380)

This invention relates to improvements in remote indicating means and has particular reference to an improved electrical apparatus for providing a visible indication of mechanical movement at some location remote from that at which the movement takes place.

An object of the invention resides in the provision of an apparatus of the character indicated which produces a relatively large scale reading for a minute movement.

A further object resides in the provision of indicating apparatus of the character indicated which may be energized or de-energized at will and which, when de-energized, will not get out of step but will on the contrary, be in condition to provide an accurate indication of the position of a movable mechanical element immediately the apparatus is re-energized.

Other objects and advantages will be pointed out hereinafter or will become apparent as the description proceeds.

In the accompanying drawings, in which like reference numerals are used to designate similar parts throughout, there is somewhat diagrammatically illustrated a suitable mechanical embodiment for the purpose of disclosing the invention. The drawings, however, are for the purpose of illustration only and are not to be taken as limiting or restricting the invention since it will be apparent to those skilled in the art that various changes in the illustrated embodiment may be resorted to without in any way exceeding the scope of the invention.

In the drawings, Fig. 1 is a sectional view through that unit of the indicating apparatus which is directly associated with the movable mechanical element.

Fig. 2 is a sectional view through that unit of the indicating apparatus which provides the visible indication of mechanical movements.

Fig. 3 is a front elevational view of the unit illustrated in Fig. 2.

Fig. 4 is a transverse sectional view of the unit illustrated in Fig. 2 taken on the line 4—4 of Fig. 2.

Fig. 5 is a plan view of a portion of Fig. 1 showing the spring assembly.

Fig. 6 is a view on line 6—6 of Fig. 5.

Fig. 7 is a view on line 7—7 of Fig. 5, and

Fig. 8 is a wiring diagram of the electrical circuits for the units shown in Figs. 1 and 2.

The device shown in the drawings embodies the principles of known auto synchronous devices such as the device referred to in the electrical art as the "Autosyn." Such a device includes a generator at the point of actuation and a motor at the point of reception. In the present invention the armature of the generator is connected to the element the movement of which is to be indicated, and the armature of the motor or follower is connected to an indicating device such as a pointer or plurality of pointers movable over a graduated dial. When the generator armature is rotated, the motor armature turns synchronously therewith, in the same direction, at the same speed, and through the same arc.

In the arrangement illustrated, the generator is indicated at 10 and the motor at 12. The generator has its armature 14 connected to the element the movements of which are to be indicated. By means of a leaf spring contactor 15 engaging the end of the armature 14, the rotor may be energized from any suitable source of electricity. Armature 14 is supported for rotation in the stator 16 by bearings 18 and 20 supporting shaft 22. The end of shaft 22 projecting through bearing 18 extends through a pinion 24 with which it has a spline connection, and into a bearing recess in a hub 26 within the casing and having a gear 28 secured to the end of hub 26 without the casing. For simplicity of description, gear 28 is considered to be the element the movement of which is to be indicated, and its hub 26 is rotatably mounted in the end casing 30 on a bearing 32. A gear 34 is rotatably supported on shaft 22 between hub 26 and pinion 24 and is operatively connected to pinion 24 by a pinion 36 and gear 37, thus causing angular rotation of pinion 24, and armature 14, materially greater than the simultaneous rotation of gear 34.

The generator is provided with mechanism normally accurately locating gear 28 with respect to gear 34 and armature 14, geared thereto, but arranged to permit relative movement of gear 28 in either direction when gear 34 is held against rotation (Figs. 1, 5, 6, 7). This mechanism comprises a spring 40 having an outer end fastened in a spring container 27, integral with hub 26. The inner end of spring 40 is secured to the hub portion of a stop member 39 freely rotatable on hub 26. The spring container 27 is provided with a lip or extension 42 and the stop member 39 is provided with an extension 41 co-acting with and forming a stop for the lip 42. Spring 40 acts to normally hold lip 42 and stop 41 in contact as shown in Fig. 6.

The inner end of a second spring 38 is fastened to the hub portion of the stop member 39 on the opposite side of extension 41 from spring 40. The outer end of spring 38 is fastened in a spring container 33 integral with gear 34, and has a lip or extension 44. Spring 38 acts to force lip 44 into contact with stop 41 in the same way that spring 40 acts to force lip 42 into contact with the stop 41.

Thus stop 41 is positioned from gear 34, and, through lip 42, the spring container 27 and gear 28 are positively positioned with respect to stop 41. Hence gear 28 is positively positioned with respect to gear 34. Since gear 34 is positively positioned with respect to armature 14, it will be seen that gear 28 will always take a fixed position with respect to the armature when all the elements are free to move.

The opposite end of shaft 22, beyond bearing 20, carries a brake plate 43 longitudinally slidable on a splined portion of the shaft. Plate 43 is positioned between a transverse wall of the end housing 45 and a pressure plate 46 held against rotation by slide pins 48 and urged against the brake plate by compression springs 50. When the system is electrically energized plate 46 is held out of contact with brake plate 43 by an electromagnet 52 so that shaft 22 may be rotated by movement of gear 28. When the units are de-energized armature 14 is held against rotation and any slight movements of gear 28 are absorbed by clock springs 38, 40 as described in detail above.

Motor 12 has an armature 54 supported for rotation in stator 55 on bearings 56 and 58. At its end near bearing 58 the armature shaft 60 carries a slip ring 62 contacted by a brush 64 for energizing the armature windings. Upon the end of shaft 60 projecting beyond bearing 56 the shaft carries a pinion 66 fast thereto.

Beyond pinion 66 shaft 60 carries a bearing which supports for rotation a gear 76 driven at reduced speed by pinion 66 through gear 74 and pinion 75. Gear 76 has an elongated tubular hub 68 supported for rotation by bearing 72 in a partition in housing 70. The outer end of hub 68 carries a pointer 78 (Figs. 2 and 3) movable over dial 80.

A small shaft 82 extends from the end of armature shaft 60, through tubular hub 68, and carries on its outer end a pointer 84, also movable over dial 80.

If the motor gear train has the same ratio as the generator gear train pointer 78 will have the same degrees of angular movement as gear 28. Pointer 84, on shaft 82, has a movement greater than the movement of pointer 78, on hub 68, by the ratio of the gear train including the gear 74 and may be used to indicate fractional portions of degree movement of the gear 28. For example, if the ratio of the above-mentioned gear train is one to ten, the pointer 78 will indicate movements of gear 28 in degrees and pointer 84 will indicate such movements in tenths of a degree on the same dial scale.

For some purposes it may be desirable to use the "Autosyn" as an automatic control device and even to render such a control device manually adjustable. One arrangement for this purpose is shown in the drawings, in which a rotatable sleeve 86 (Fig. 2) surrounds motor hub 68. Sleeve 86 is provided with a disc-like gear 88 having teeth 90 (Fig. 4) engaged by the teeth of a pinion 92 on shaft 96 which also carries a hand knob 94. Gear 88 carries electrical contact members 98 and 100 which cooperate with a contact arm 102 carried by hub 68 and rotatable therewith. Circuits may be completed to the contact elements 98, 100 and 102 through the slip rings 104, 106 and 108 respectively and the corresponding brushes 110, 112 and 114. The rotational position of gear 88 may be indicated by a pointer 116 carried by the sleeve 86 and movable over the dial 80.

The control mechanism described and shown herein is particularly adapted for application to aircraft for the purpose of indicating on the instrument panel in the cockpit of a plane the blade settings of an adjustable pitch propeller during operation.

A particular advantage of the improved indicating device resides in the fact that the generator and motor will not get out of step with each other if gear 28 is rotated while the units are not energized. Under such conditions neither armature will move, since armature 14 of the generator will be held against rotation by brake plate 43, while inadvertent movement of gear 28, within certain limits, is absorbed by the springs 38 and 40, the armature 54 of motor 12 being held against rotation by the friction of the various slip rings and brushes and the pointer operating mechanism. If gear 28 be released while the system is de-energized, springs 38, 40 will restore it to proper position with reference to the indicator. If, however, the system be electrified while gear 28 is held out of position, clutch 42 will release armature 14 and springs 38, 40 will rotate the armature to its normal angular relationship with gear 28, and, of course, motor armature 54 and the pointers controlled by it will also move to properly indicate the new position of gear 28.

While a suitable mechanical embodiment has been hereinabove described and illustrated in the accompanying drawings for the purpose of disclosing the invention, it is to be understood that the invention is not limited to the particular embodiment so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In a transmitter for a movement indicating system, a transmitting generator having a stator fed from a source of alternating current and a rotor cooperating with the stator to generate voltages in accordance with movements of the rotor, a rotatable element capable of rotating the rotor a plurality of revolutions, resilient means so connecting the rotatable element with the rotor that the rotatable element may be moved relative to the rotor when the rotor is restrained from movement and that when the restraint is removed the rotor will catch up with the movement of the movable element, and means for restraining movement of said rotor when said stator is de-energized.

2. In a transmitter for a movement indicating system, a transmitting generator having a stator fed from a source of alternating current and a rotor cooperating with the stator to generate voltages in accordance with movements of the rotor, a rotatable element capable of rotating the rotor a plurality of revolutions, resilient means so connecting the rotatable element with the rotor that the rotatable element may be moved relative to the rotor when the rotor is restrained from movement and that when the restraint is removed the rotor will catch up with the movement of the movable element, a spring applied brake for restraining movement of said rotor when said stator is de-energized, and means releasing said brake when said stator is energized.

3. In a transmitter for a movement indicating system, a transmitting generator having a stator fed from a source of alternating current and a rotor cooperating with the stator to generate voltages in accordance with movements of the rotor, a rotatable element capable of rotating the rotor a plurality of revolutions, resilient means so connecting the rotatable element with the rotor that the rotatable element may be moved relative to the rotor when the rotor is restrained from movement and that when the restraint is removed the rotor will catch up with the movement of the movable element, a spring applied brake for restraining movement of said rotor when said stator is de-energized, and a solenoid connected to said alternating current source for releasing said brake when said stator is energized.

4. In a transmitter for a movement indicating system, a transmitting generator having a stator fed from a source of alternating current and a rotor cooperating with the stator to generate voltages in accordance with movements of the rotor, a rotatable element capable of rotating the rotor a plurality of revolutions, oppositely disposed springs resiliently connecting the rotatable element with the rotor so that the rotatable element may be moved limited distances relative to the rotor when the rotor is restrained from movement and so that when the restraint is removed the rotor will catch up with the movement of the movable element, and means for restraining movement of said rotor when said stator is de-energized.

NELSON R. RICHMOND.